UNITED STATES PATENT OFFICE 2,132,083

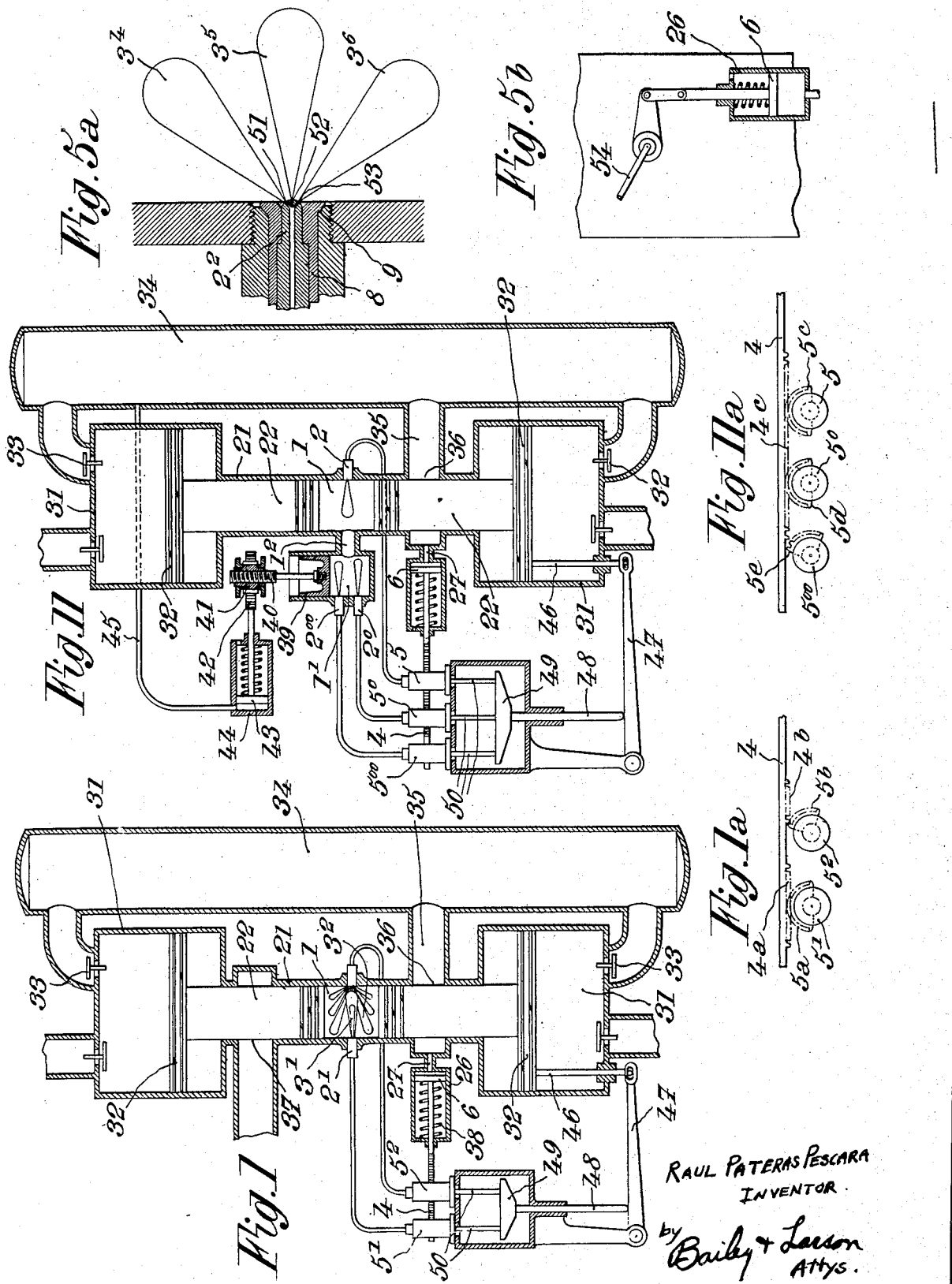

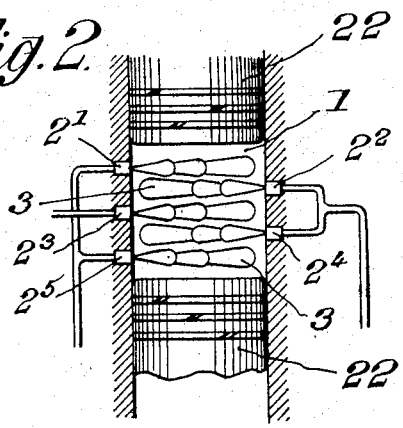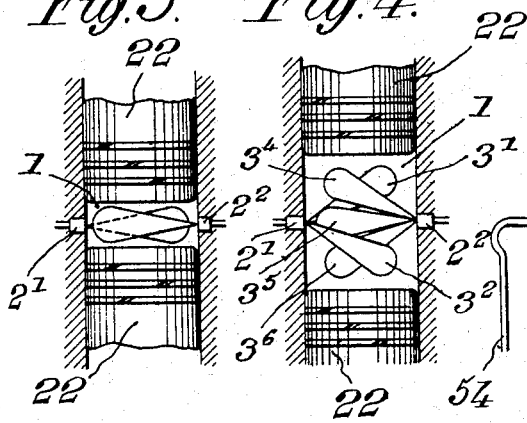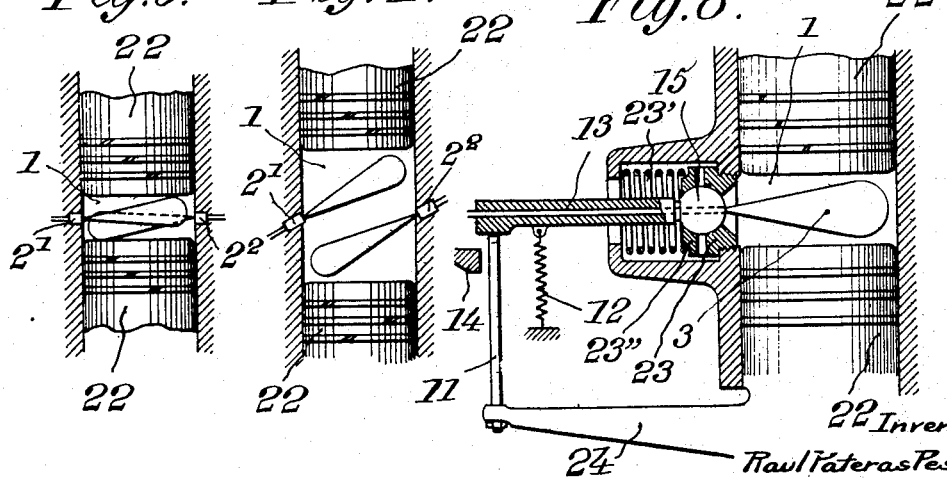

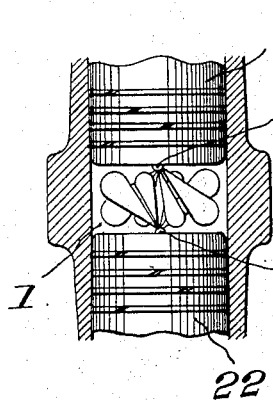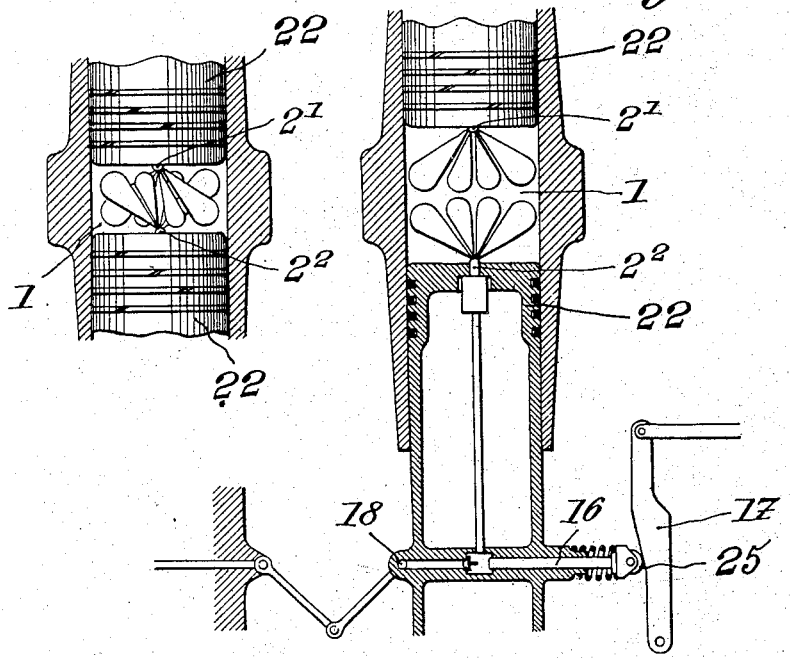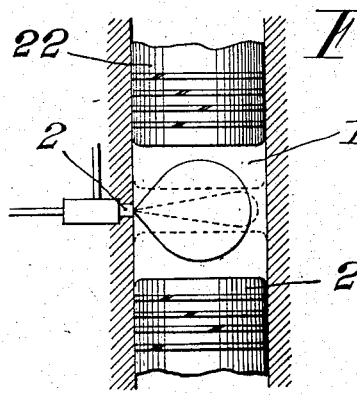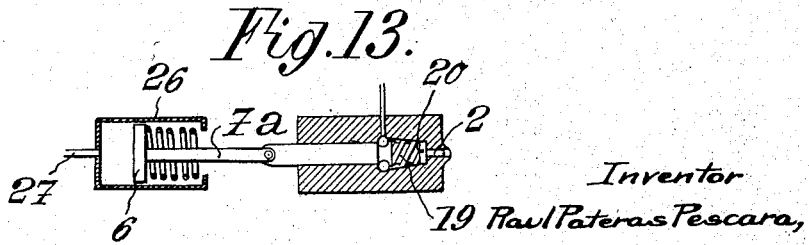

FUEL INJECTION IN FREE PISTON INTERNAL COMBUSTION ENGINES

Raul Pateras Pescara, Paris, France, assignor to Société d'Etudes et de Participations, Eau, Gaz, Electricite, Energie, S. A., Geneva, Switzerland Application June 1, 1936, Serial No. 82,994
In Belgium June 5, 1935

8 Claims. (Cl. 123—32)

This invention relates to internal combustion engines, and more particularly to that type of free piston internal combustion engines combined with air compressors commonly referred to as free piston motor compressor units; and it relates still more particularly to a method and apparatus for injecting fuel into free piston motor compressors adapted to operate under conditions entailing considerable variations in the volume of the combustion chamber at the end of the compression stroke. In this respect, it is particularly applicable to free piston motor compressors adapted to deliver a compressed heat conveying gaseous medium at relatively low temperature, said gaseous medium being subsequently available for divers uses, as, for example, to generate power in heat engines, such as gas turbines or other expansion engines. These devices are usually called upon to operate under variable conditions of power output which entail corresponding variations in the pressure of the gaseous medium delivered and in the intake pressure of the combustion air; and it is a characteristic feature of prime movers of this type that, when they operate under variable loads, the volume of the combustion chamber at the end of the compression stroke, hereinafter called the maximum compression combustion chamber volume, varies substantially as and with the power output of the unit.

These variations in the maximum compression volume of the combustion chamber introduce certain difficulties relating to the injection of the fuel, in that, as the combustion chamber increases in volume, it becomes increasingly difficult to distribute the fuel throughout said combustion chamber in a manner to make the most efficient use of the combustion air, that is, to secure substantially complete combustion of the fuel with the lowest possible percentage of excess air.

The main purpose of my invention is to facilitate and to improve the combustion of the fuel in said free piston engines, and therefore to increase their thermal efficiency and to reduce the wear on the engine parts.

The principal object of my invention is to provide an improved free piston motor compressor unit of the type described, comprising fuel injecting means having a variable range of action, meaning thereby the aggregate volume of the zone effectively covered by the jet or jets of fuel discharged by said fuel injecting means, and means for adjusting said fuel injection range in accordance with the variations in the volume of the combustion chamber at the end of the compression stroke, said fuel injection range adjusting means being controlled by at least one factor related to said volume of the combustion chamber at the end of the compression stroke either as a cause or as a correlated effect. Among such controlling factors, the most convenient seem to be the length of stroke of the free pistons, the pressure of the air supplied to the motor cylinder at the intake and the volumetric compression ratio, although other factors, such as the power output and others, may also be used, either alone or in combination.

Another object of my invention is to provide a free piston motor compressor unit, in which the range of said fuel injecting means is varied in accordance with the variations in the volume of the combustion chamber at the end of the compression stroke, by varying the number of injectors in service, said variation being controlled by at least one factor related to said volume of the combustion chamber at the end of the compression stroke.

A still further object is to provide an improved free piston motor compressor unit comprising a main combustion chamber of substantially constant volume at the end of the compression stroke, and an auxiliary combustion or ignition chamber communicating with said main combustion chamber, said auxiliary combustion chamber being of variable volume at the end of the compression stroke, means for injecting fuel into said main combustion chamber, means for injecting fuel into said auxiliary combustion chamber, means for varying the injection range of said auxiliary chamber fuel injecting means in accordance with the variations in the volume of said auxiliary combustion chamber at the end of the compression stroke, and means for controlling said range adjusting means through the medium of at least one factor related to said volume of the combustion chamber.

A still further object of my invention is the method of injecting fuel into free piston engines consisting in varying the injection range of the fuel injecting means in accordance with the variations in the volume of the combustion chamber at the end of the compression stroke, and in controlling said injection range adjustment through the medium of at least one factor related to said volume of the combustion chamber at the end of the compression stroke.

Further objects and advantages will appear and will be readily understood by a person skilled in the art, from the following description with reference to the accompanying drawings; it being understood, of course, that said description and drawings are given mainly by way of illustration, and should not be construed as limiting the scope of the invention.

In these drawings:

Fig. 1 shows diagrammatically and in cross-section one form of control mechanism according to the invention applied to a motor compressor unit with opposed free pistons.

Fig. 1a shows a detail of the structure according to Fig. 1.

Fig. 2 shows, in axial cross-section, a part of a free piston engine with another modification of the invention.

Figs. 3 and 4 are views similar to Fig. 2 and show a third modification.

Fig. 5 shows one form of control mechanism for the modification according to Figs. 3 and 4.

Fig. 5a is an enlarged section of the injection nozzle shown in Fig. 5.

Fig. 5b shows the actuating mechanism for oscillating the injection nozzle according to Fig. 5.

Figs. 6 and 7 show still another form of my invention, the first when the maximum compression volume of the combustion chamber has its minimum value, the second when said volume has its maximum value.

Fig. 8 shows one form of the control mechanism for the above case.

Figs. 9 and 10 show the injection of fuel, according to my invention, through the working faces of two opposed pistons.

Fig. 11 shows a motor compressor unit similar to that of Fig. 1 but provided with still another modification of the invention.

Fig. 11a shows a detail of the construction according to Fig. 11.

Figs. 12 and 13 show an opposed-piston engine, provided with another embodiment of my invention.

Fig. 1 shows one form of my invention applied to a motor compressor unit which consists of a motor cylinder 21 provided at opposite ends with compression cylinders 31. Two motor pistons 22 reciprocate in opposite direction within motor cylinder 21 and are provided at their respective outer ends with compression pistons 32, 32', which reciprocate in compression cylinders 31, secured to the outer ends of the motor cylinder 21. The pistons 22, 32 are of the type known as free pistons; that is, pistons the stroke of which is not limited to any fixed size by any mechanical means. Discharge valves 33 of compression cylinder 31 connect the inside of these cylinders with a storage tank 34 for holding compressed air, which, in turn, is connected by a conduit 35 within an opening 36 of the lower motor cylinder 21. Fuel pumps $5^1$, $5^2$ supply the fuel under pressure to at least two nozzles $2^1$, $2^2$, which may be arranged, for example, in a diametrically opposed position in the walls of combustion chamber 1, which is located intermediate pistons 22.

After the fuel has been injected into combustion chamber 1 and brought to combustion, pistons 22 and 32 move outwardly and compress the air in cylinders 31 which is then lead through one-way valves 33 into the storage tank 34. During this compression movement, pistons 22 release the inlet opening 36 and the discharge opening 37 so that the compressed air stored in tank 34 can enter combustion chamber 1 and flush the combustion products out of discharge opening 37. The hot mixture of combustion products and compressed air may then be utilized for the operation of any other device not shown by the drawings.

It is well-known in the art of motor compressors which operate with free pistons that the inner dead center position of pistons 22 is variable and dependent on the amount of pressure of the air stored in tank 34. If this pressure is high, the inward stroke of pistons 22 is relatively short, since the compressed air, which has previously been passed into chamber 1 for flushing the combustion products therefrom, requires only relatively small additional compression by pistons 22 to reach the point necessary for the combustion of the fuel. Accordingly, at a lower inlet pressure of the air into chamber 1, the inward stroke of pistons 22 must be longer in order to obtain the same air pressure in the combustion chamber which is obtained with a greater pressure and a shorter stroke. The size of the inward stroke of pistons 22, and the size or volume of compression chamber 1, which is formed intermediate pistons 22 when they are at their inner dead center position, is, therefore, dependent on the pressure of the flushing air with which chamber 1 is precharged.

Fuel pumps $5^1$, $5^2$ are actuated by the piston 32' which is provided at its lower surface with a rod 46 pivotally secured to a hinged lever 47. The oscillating motion of lever 47 produced by piston 32' is transmitted to pumps $5^1$, $5^2$ through a sliding rod 48 and a cross-head 49 which is secured to piston rods 50.

For controlling the amount of fuel supplied by pumps $5^1$, $5^2$ in accordance with the pressure of air in tank 34, I provide a conduit 27 connected to the conduit 35 and a cylinder 26 in which a piston 6 is moved by the air pressure against the action of a spring 38. The piston rod of piston 6 is provided at its free end with a rack 4 carrying two sets of teeth 4a and 4b which cooperate with two toothed sectors 5a and 5b of pumps $5^1$ and $5^2$, respectively, to control the fuel supply in a known manner. As shown by Fig. 1a, the two sets of teeth are of different length so that the teeth 4a engage with the teeth 5a of pump $5^1$ at all pressures transmitted from tank 34, while teeth 4b engage with teeth 5b of pump $5^2$ only when the pressure in tank 34 exceeds a certain limit. Since pump $5^1$ is connected to injection nozzle $2^1$ and pump $5^2$ to nozzle $2^2$, at low pressures in tank 34 and corresponding long inward strokes of pistons 22, 22', which leave only a small combustion chamber 1 between themselves at the inner dead center position thereof, fuel is supplied only by pump $5^1$ to nozzle $2^1$ which injects the fuel into the combustion chamber in a small jet $3^1$ directed substantially perpendicularly to the axis of cylinder 21. If, on the other hand, the pressures in tank 34 increase and the inward strokes of pistons 22, 22' reduce in size, the volume of combustion chamber 1 at the inner dead center position of piston 22, 22' increases. Simultaneously, piston 6 is depressed in cylinder 26 against the action of spring 38 so that teeth 4b engage with teeth 5b to permit pump $5^2$ to supply fuel to nozzle $2^2$ which injects the same into combustion chamber 1 in the form of a conical jet or in a plurality of jets $3^2$ which are inclined outwardly from nozzle $2^2$ so as to spray the fuel throughout the enlarged combustion chamber 1.

In the modification according to Fig. 2, I provide a plurality of injecting nozzles $2^3$ to $2^7$ whose range of injection I control either by a similar device, as shown in Fig. 1, or by means of the pistons 22 which cover at least some of nozzles $2^4$ to $2^7$ when the pressure in tank 34 is low and compression chamber 1 is small, or by both means.

In Figs. 3 and 4, I show another arrangement of the fuel injectors, in which said injectors $2^1$ and $2^2$ are designed to deliver fuel either in a flat fish-tail shaped jet 3 or in a plurality of diverging jets $3^1$ to $3^6$ lying substantially in a plane; and I vary the range of injection by revolving the injectors $2^1$ and $2^2$ around their axis, their angular displacement being suitably related to the increase in the maximum compression volume of the combustion chamber. Thus, in Fig. 3, I show conditions when the maximum compression combustion chamber volume is at a minimum, in which case the injectors $2^1$ and $2^2$ are set so that the jets $3^1$, $3^2$, etc., lie substantially in a common transversal plane; whereas Fig. 4 shows conditions when the maximum compression volume of the combustion chamber is substantially maximum, in which case the injectors are set so that the jets lie respectively in planes which are nearly coincident with each other and with an axial plane through the injectors $2^1$ and $2^2$. Fig. 5 shows the details of one embodiment of the operating mechanism, whereby the injectors $2^1$ and $2^2$ may be rotated. In this figure, $2^0$ is a cartridge member screwed into the wall of the cylinder 1, through which cartridge member is rotatably inserted the cylindrical body 8 of the injector proper, said body 8 being preferably terminated by a conical portion 9 co-acting with a corresponding seat in the wall of cylinder 1, to give a perfect seal under the action of the pressure in the cylinder, and of the spring 10. Fig. 5a shows that the nozzle $2^2$ of the injector according to Fig. 5 is provided with three small openings 51, 52, 53 which lie in the same plane. At the moment when pistons 22 are in their inner dead center position, leaving a large combustion chamber 1, openings 51 to 53 lie in a common plane which is directed parallel to the axis of cylinder 21 and the fuel jets $3^4$ and $3^6$ are directed at an angle to the heads of pistons 22. At the time when pistons 22 assume their inner dead center position in a small combustion chamber 1, the nozzle $2^2$ is turned 90° about its axis by means of a crank arm 7 which is connected to a piston 6 slidable in a cylinder 26 under the action of the compressed air in tank 34 similarly as shown in Fig. 1, and the jets $3^4$, $3^5$, $3^6$ lie in a plane vertical to the axis of cylinder 21. Numeral 54 indicates the conduit through which the fuel is lead from a pump to the injecting nozzle $2^2$.

In Figs. 6 and 7, I indicate other means of varying the injection range, whereby the injectors, at least two in number, are set in the cylinder wall preferably in diametrical opposition, and are designed so that their axes may be inclined or rotated, preferably in an axial plane passing through said injector.

Fig. 6 shows the minimum, and Fig. 7 the maximum volume position of the fuel injection; while Fig. 8 indicates, by way of example, the details of one embodiment of the design. In said embodiment, the body 13 of the injector proper terminates in a spherical tip 15 which is tightly held in a spherical seat formed in a screw-bushing 23, by a spring 23' and washer 23'', which leave sufficient freedom for rotating the stem 13 of said injector as illustrated in Fig. 7. Said rotation is effected automatically, by means of the position of the reciprocating pistons, said piston 22 being provided externally with a cross arm 24 to which is secured a push rod 11.

When the maximum compression volume of the combustion chamber has reached a minimum value, pistons 1 travel to the minimum distance from each other, and push rod 11 forces the injector into a position substantially perpendicular to the axis of the combustion chamber. But as the pistons travel away from each other, the spring 12 pulls on the stem 13 of the injector, and so causes it to swing in an axial plane, until it rests against the stop member 14. This is the position for maximum injection range, it being understood, of course, that the opposite injector occupies the opposite position, as shown in Fig. 7.

In Figs. 9 and 10, I have shown an arrangement wherein the fuel injectors are inserted in the working faces of the two opposed pistons, in a manner to direct the fuel jets axially against each other, and so to give the maximum turbulence. In this case, I prefer to design the injectors so as to deliver the fuel, either in wide-angle conical jets, or in a plurality of jets, lying in wide angle conical zones opposed at their bases. It is clear that, as the distance between said pistons is increased, said jets will sweep the enlarged volume of the combustion chamber. In this particular case, it is possible to simplify the fuel injection considerably, by securing the fuel pump 16 directly to the rear face of piston 22, and providing it with a cam roller 25 co-acting with a stationary cam member 17, in such a manner that the motion of the piston itself commands the time of injection. The fuel feed line 18 should, of course, be made flexible, or be composed of articulated tubular links, in order that it may follow the reciprocating motion of the piston.

In Fig. 11, I have illustrated a motor compressor unit similar to that shown in Fig. 1. However, the necessary pressure for a good combustion of the fuel in the combustion chamber 1 is not produced by a variation of the strokes of the main pistons 22 in accordance with the variation of the pressure of the flushing or charging air in tank 34, but by a variation of the volume of an auxiliary combustion chamber $1^1$. The chamber $1^1$ is a type of combustion chamber. The combustion gases produced in this chamber $1^1$ pass through the connecting channel $1^2$ to the main combustion chamber 1 and there act on the opposed pistons and drive the same.

The purpose of such auxiliary chamber is to permit variation while maintaining the volume of the main combustion chamber constant at different pressures. This is possible since variation in the volume of the auxiliary chamber permits the volume of the main combustion chamber at inner dead center position to remain constant even though the pressure and therefore the volume of the scavenging air varies. In order to obtain a constant pressure at the end of the compression in the combustion chamber in spite of the variable feed chamber, the size of the auxiliary chamber $1^1$ is increased or decreased, with increases or decreases in pressure, so that the size of the main combustion chamber may remain unchanged. The volume of this chamber $1^1$ is changed by an auxiliary piston 39, the piston rod of which is provided at its outer end with screw threads 40 and screwed into a nut 41 which carries on its outside teeth which cooperate with a rack 42. A piston 43 is secured to rack 42 and slides in a cylinder 44 which is connected by a conduit 45 to the inside of tank 34. The axial movement of rack 42 causes rotation of unit 41 whereby the threaded piston rod and piston 39 are moved in axial direction of the auxiliary chamber $1^1$. Since at increased pressure of the air in tank 34, piston 43 is moved toward the right, the volume of chamber $1^1$ increases, while at reduced air pressure in tank 34 the volume of chamber $1^1$ decreases.

The compression chamber 1 of this modification of the invention is provided with a single injection nozzle 2 similar to nozzle $2^1$ of Fig. 1, while the auxiliary combustion chamber $1^1$ is provided with two nozzles $2^0$ and $2^{00}$. The three nozzles are connected to pumps 5, $5^0$, $5^{00}$, respectively, which are controlled by a rack 4 which is actuated by piston 6 in accordance with the air pressure in tank 34. At low pressures in tank 34 and a small volume of auxiliary chamber $1^1$ only pumps 5 and $5^0$ are able to supply fuel to nozzles 2 and $2^0$, while at increased pressures in tank 34 and a larger volume of chamber $1^1$, pump $5^{00}$ is also actuated to supply fuel to nozzle $2^{00}$. The other elements of the unit shown in Fig. 11 are similar to the corresponding elements described in connection with Fig. 1.

Finally, I have indicated in Figs. 12 and 13 the particular embodiment of my invention consisting in adjusting the injection range of the fuel injector or injectors, by varying the shape of the jet, in accordance with the variations in the maximum compression volume of the combustion chamber. I attain this end by any suitable means, for example by incorporating in the injector an axially slidable guiding member 20 provided on its surface with helical grooves 19 through which the fuel is fed under pressure. This imparts to the fuel a rapid whirling motion which motion, if it continues when the fuel is released in the combustion chamber, causes the vein to flare outwardly, as shown in solid outline in Fig. 12, thus substantially filling the combustion chamber. On the other hand, this whirling motion is fully retained by the released fuel only when the guiding member 20 is close to the orifice 2 of the injector. I therefore provide means for sliding said guiding member 20 axially away from the orifice. The whirling motion is then partially or totally expended in internal turbulence within the injector, depending on the position of guiding member 20 with respect to the orifice 2; so that, when the guiding member 20 is withdrawn to the extreme limit, the jet assumes the shape shown in dotted lines in Fig. 12.

A piston 6 is slidable in a cylinder 26 and connected by a rod 7a to said guiding member 20. Cylinder 26 is connected by a conduit 27 to the tank 34 as shown in Figs. 1 and 11. The guiding member 20 is, therefore, adjusted relative to orifice 2 in accordance with the air pressure in tank 34.

In accordance with one embodiment of my invention, I control the adjustment of the injection range of the fuel injecting means through the medium of the pressure of the air or gaseous mixture delivered to the intake of the motor cylinder. To this end, I provide, as shown in Fig. 1, a cylinder 26 co-acting with a piston 6 and communicating through a control line 27 with the intake manifold or with any convenient portions of the air supply circuit of the motor cylinder, so that said piston 6 is subjected to the pressure of the air supplied to the intake of the motor cylinder; and I connect said piston 6 with the operating mechanisms $4^1$, $4^2$ of the short-circuiting by-pass of the fuel pumps $5^1$, $5^2$, after the known practice.

This method of controlling the injection range through the medium of the intake air pressure may be applied to any one of the other means described for adjusting the injection range in accordance with the volume of the combustion chamber at the end of the compression stroke. Also the method shown in Fig. 8 for controlling the injection range through the medium of the length of stroke of the free piston or pistons may be applied to any one of the other range adjusting methods described.

By means of the above described invention, I obtain a free piston motor compressor unit in which the most efficient use is made of the air or combustion supporting gaseous mixture supplied to the motor cylinder, and in which substantially complete combustion is obtained with the minimum proportion of excess air, regardless of the variations in the volume of the combustion chamber at the end of the compression stroke.

However, I wish it to be understood that I do not desire to be limited to the structural details actually shown and described, for obvious modifications thereto will occur to one skilled in the art.

What I claim is:

1. An internal combustion engine having a combustion chamber and a piston movable therein, the relative inner dead center position of the piston with respect to the combustion chamber being variable, comprising means for injecting fuel into said combustion chamber, and means for automatically varying the spacial distribution of said fuel in a direction axially of said cylinder within said combustion chamber in response to variations in the inner dead center position of the piston.

2. An internal combustion engine having a cylinder and a piston movable therein, the relative position of one with respect to the other at the end of the compression stroke being variable in a direction axially of said cylinder and forming thereby a combustion chamber of variable volume, comprising means for injecting fuel into said combustion chamber, and means responsive to variations in the volume of said chamber at the end of the piston compression stroke to vary automatically the spacial distribution of said fuel within said chamber in a direction axially of the cylinder.

3. A free piston internal combustion engine motor compressor having motor and compressor cylinders and a piston movable in said cylinders, the relative inner dead center position of the piston with respect to the motor chamber being variable, means for injecting fuel into said motor cylinder, means for conducting gas compressed in said compression cylinder to said motor cylinder to scavenge the motor cylinder and provide combustion gas therefor, and means responsive to variations in the inner dead center position of the motor piston to vary automatically the spacial distribution of said fuel within said motor cylinder in a direction axially of the cylinder.

4. A motor compressor unit composed of a free piston internal combustion engine having a motor cylinder and a piston movable in said cylinder and provided at the outer end thereof with a compressor member, and a storage tank connected to said compressor member, the relative inner dead center position of the piston with respect to the motor cylinder being variable, means for injecting fuel into said motor cylinder, means for conducting air under pressure to said motor cylinder, means for conducting air under pressure to said motor cylinder from said storage tank to scavenge the motor cylinder and provide combustion gas therefor, and means responsive to variations in the pressure of said air to vary automatically the spacial distribution of said fuel within said motor cylinder in a direction axially of the cylinder.

5. An internal combustion engine as in claim 2, in which said injection means comprises means for producing a plurality of fuel jets spaced from each other in the axial direction of said combustion chamber, and said automatic means comprising means for varying the number of fuel jets injected into said combustion chamber in accordance with the size of said chamber in the axial direction thereof.

6. An internal combustion engine according to claim 2, in which said automatic means comprise means for adjusting the position of fuel jets injected into said combustion chamber relative to each other in axial direction.

7. An internal combustion engine according to claim 2, in which said injecting means comprise at least one nozzle, means on said nozzle for producing a plurality of diverging jets of fuel, and means for rotating said nozzle about its axis with an amplitude depending upon the size of the said combustion chamber.

8. An internal combustion engine comprising a main combustion chamber the volume of which is substantially constant at the end of the piston compression stroke, means for injecting fuel into said chamber, an auxiliary combustion chamber connected to said main chamber, means for injecting fuel in said auxiliary chamber, means for varying the volume of said auxiliary chamber in the axial direction thereof, means for automatically varying the spacial distribution of the fuel within said auxiliary chamber in a direction axially of said auxiliary chamber in accordance with the alteration of the volume of said auxiliary chamber, the spacial distribution of fuel within said main chamber being substantially invariable.

RAUL PATERAS PESCARA.